US009881295B1

(12) United States Patent
Buddhavarapu (10) Patent No.: US 9,881,295 B1
(45) Date of Patent: Jan. 30, 2018

(54) FACE-TO-FACE PAYMENTS WITH AUGMENTED REALITY

(75) Inventor: Satish Buddhavarapu, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 1395 days.

(21) Appl. No.: 13/361,737

(22) Filed: Jan. 30, 2012

(51) Int. Cl.
 *G06Q 20/32* (2012.01)
 *G06Q 20/00* (2012.01)
 *G06Q 20/08* (2012.01)

(52) U.S. Cl.
 CPC .......... *G06Q 20/322* (2013.01); *G06Q 20/00* (2013.01); *G06Q 20/08* (2013.01)

(58) Field of Classification Search
 CPC .. G06Q 20/40; G06Q 20/102; G06Q 20/3223; G06Q 20/10; G06Q 20/3224; G06Q 20/322; G06Q 20/40145; G06Q 20/3221; G06Q 20/4014; G06Q 20/3821; G06Q 20/388; G06Q 20/32; G06Q 20/3226; G06Q 20/3227; G06Q 30/0215; G06Q 30/0253; G06Q 20/204; G06Q 20/20; G06Q 20/3278; G06Q 20/363; G06Q 20/382; G06Q 20/327; G06Q 20/3276; G06Q 20/325; G06Q 20/3274; G06Q 20/4016; G06Q 30/0267; G06Q 30/0609; G06Q 30/0281; G06Q 50/265; G06Q 20/401; G06Q 30/0261; G06Q 20/02; G06Q 20/027; G06Q 20/108; G06Q 20/227; G06Q 20/405; G06Q 30/0269
 See application file for complete search history.

(56) References Cited

U.S. PATENT DOCUMENTS

| 6,072,894 A * | 6/2000 | Payne ............... G07C 9/00158 235/375 |
| 6,269,348 B1 * | 7/2001 | Pare, Jr. ............... G01F 19/005 705/18 |
| 8,345,931 B2 * | 1/2013 | Jeronimus ............ G06Q 20/10 340/5.83 |
| 2006/0265602 A1 * | 11/2006 | Robinson .............. G06Q 20/04 713/186 |
| 2007/0194110 A1 * | 8/2007 | Esplin ................... G06Q 20/20 235/383 |
| 2010/0094754 A1 * | 4/2010 | Bertran ................. G06Q 20/40 705/44 |
| 2011/0249144 A1 * | 10/2011 | Chang ............... G06F 17/30259 348/231.3 |
| 2012/0078787 A1 * | 3/2012 | Mehew ................. G06Q 20/40 705/44 |
| 2012/0158582 A1 * | 6/2012 | Nuzzi .................... G06Q 20/10 705/40 |

* cited by examiner

Primary Examiner — Elda Milef
(74) Attorney, Agent, or Firm — Osha Liang LLP (57) ABSTRACT

A method for making a payment using a mobile device. The method includes capturing a facial image of a payee using a camera of the mobile device, wherein the payment is due from the user of the mobile device to the payee, retrieving an identifier of the payee based on the facial image, retrieving payment recipient identification information of the payee from a registered payee list based on the identifier, displaying, on the mobile device, a composite image comprising the facial image of the payee and the payment recipient identification information of the payee, receiving an input from the user authorizing the payment from a financial account of the user to the payee, and initiating the payment from the financial account to the payee based on the payment recipient identification information.

24 Claims, 5 Drawing Sheets

FACE-TO-FACE PAYMENTS WITH AUGMENTED REALITY

BACKGROUND

Mobile payment is an alternative payment method. Instead of physically presenting cash, check, or credit cards, a consumer can use a mobile phone to pay for a wide range of services or products, such as music, videos, ringtones, online game subscription, transportation fare (bus, subway or train), parking meters, books, magazines, tickets, etc. There are many models for mobile payments. The consumer may send a payment request via an SMS text message authorizing a charge to be applied to their phone bill, online wallet, or other financial accounts. The consumer may also use web pages displayed or additional applications downloaded and installed on the mobile phone to make a payment. For example, the consumer may enter credit card information or other financial account information into web pages or installed applications on the mobile device to make the payment.

Facial recognition algorithms identify human faces by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face detection.

SUMMARY

In general, in one aspect, the invention relates to a method for making a payment using a mobile device. The method includes capturing a facial image of a payee using a camera of the mobile device directed at the payee who is in the presence of a user of the mobile device, wherein the payment is due from the user of the mobile device to the payee, retrieving, by a processor of the mobile device in response to capturing the facial image, an identifier of the payee based on the facial image, retrieving payment recipient identification information of the payee from a registered payee list based on the identifier, wherein the registered payee list stores information regarding the plurality of payees and indexed by the plurality of identifiers, displaying, on the mobile device, a composite image comprising the facial image of the payee and the payment recipient identification information of the payee, receiving, by the mobile device in response to displaying the composite image, an input from the user authorizing the payment from a financial account of the user to the payee, and initiating, by the processor on the mobile device in response to receiving the input from the user, the payment from the financial account to the payee based on the payment recipient identification information.

In general, in one aspect, the invention relates to a mobile device for making a payment. The mobile device includes (i) a camera configured to capture a facial image of a payee while directed at the payee who is in the presence of a user of the camera, wherein the payment is due from the user of the mobile device to the payee, (ii) a payee analyzer executing on a processor of the mobile device and configured to retrieve, in response to capturing the facial image, an identifier of the payee based on the facial image, (iii) a user interface module executing on the processor and configured to retrieve payment recipient identification information of the payee from a registered payee list based on the identifier, wherein the registered payee list stores information regarding the plurality of payees and indexed by the plurality of identifiers, display a composite image comprising the facial image of the payee and the payment recipient identification information of the payee, and receive, in response to displaying the composite image, an input from the user authorizing the payment from a financial account of the user to the payee, and (iv) a payment module executing on the processor and configured to initiate, in response to receiving the input from the user, the payment from the financial account to the payee based on the payment recipient identification information.

In general, in one aspect, the invention relates to a non-transitory computer readable storage medium storing instructions for making a payment using a mobile device. The instructions, when executed, comprise functionality to capture a facial image of a payee using a camera of the mobile device directed at the payee who is in the presence of a user of the mobile device, wherein the payment is due from the user of the mobile device to the payee, retrieve, in response to capturing the facial image, an identifier of the payee based on the facial image, retrieve payment recipient identification information of the payee from a registered payee list based on the identifier, wherein the registered payee list stores information regarding the plurality of payees and indexed by the plurality of identifiers, display, on the mobile device, a composite image comprising the facial image of the payee and the payment recipient identification information of the payee, receive, in response to displaying the composite image, an input from the user authorizing the payment from a financial account of the user to the payee, and initiate, in response to receiving the input from the user, the payment from the financial account to the payee based on the payment recipient identification information.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a device, method, and user interface to assist face-to-face payment using a mobile device based on augmented reality. Specifically, the payment is due to the payee from a user of the mobile device and is made when both the payee and the user are present together. For example, the payment may be to settle money owed by the user to the payee, to complete a purchase by the user for a product or service from the payee, to make an advance payment, to serve as a gift, etc. Throughout this disclosure, the term "augmented reality" refers to a sequence of screen images displayed on the mobile device and includes a live facial image of a payee overlaid with payee payment recipient identification information and financial account information of the user of the mobile device. Further, the term "facial image" may refer to a static image of a face, a video snap shot (e.g., a video frame in a video stream) of a face, or real-time playback of captured video stream of a face.

Figure 1:
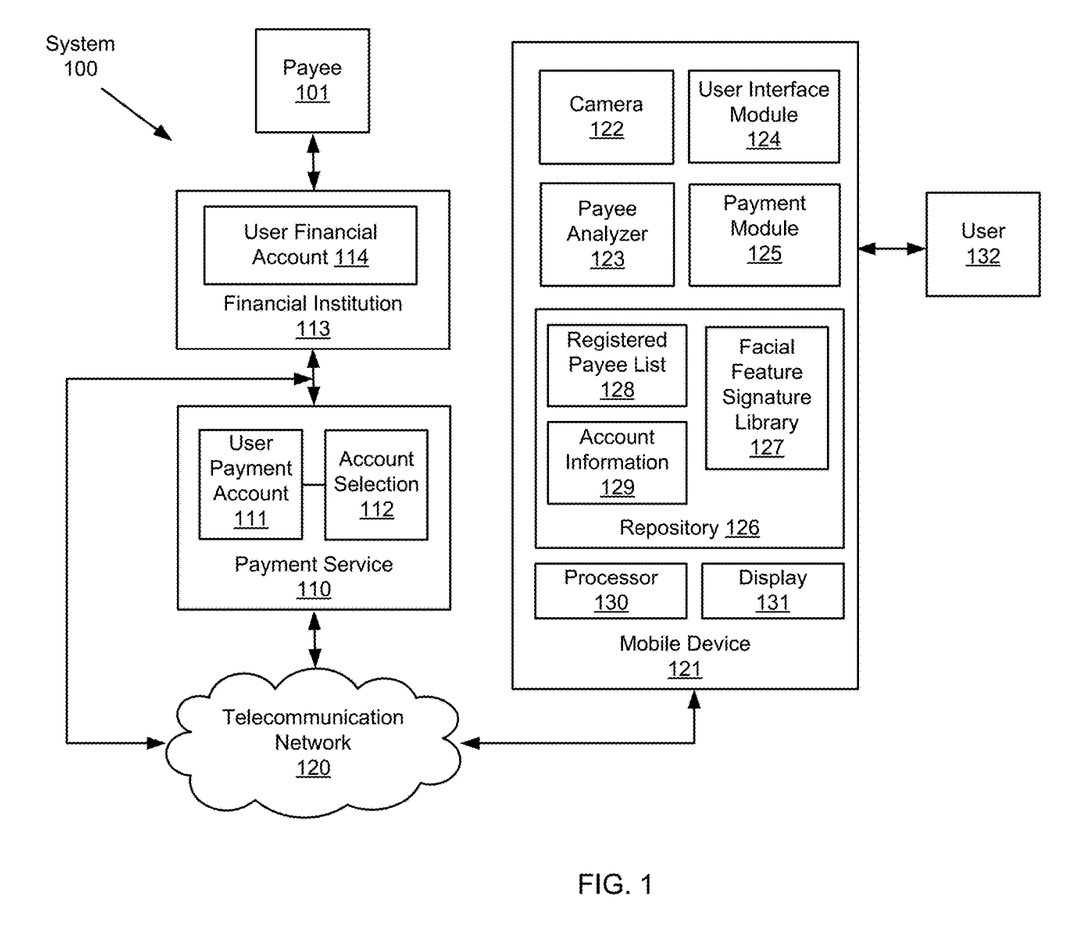
FIG. 1 shows a schematic diagram of a system for face-to-face payment with augmented reality in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a targeted advertisement system in accordance with embodiments disclosed herein.

As shown in FIG. 1, the system (100) includes a user (132) of a mobile device (121), payee (101), payment service (110), and financial institution (113) in accordance with one or more embodiments of the invention. The mobile device (121) is communicatively coupled to the payment service (110) via the telecommunication network (120). In one or more embodiments of the invention, the telecommunication network (120) may include mobile phone network, WIFI, or any other suitable wireless communication network. In one or more embodiments, the mobile device (121) may be a smartphone, a notebook computer, a tablet computer, or other mobile device configured with wireless communication capability. In particular, the mobile device (121) includes a camera (122), display (131), and processor (130), where the processor (130) is configured to execute payee analyzer (123), user interface module (124), and payment module (125) to present an augmented reality on a display (131) of the mobile device (121) to assist the face-to-face payment. As noted above, the augmented reality is based on a live facial image of the payee (101) captured using the camera (122). The display (131) may be an LCD display device, an LED display device, or other suitable flat-panel display device installed on the mobile device (121). Further, the mobile device (121) includes the repository (126) for storing a facial feature signature library (127), a registered payee list (128), and account information (129) of the user (132). In one or more embodiments, the repository (126) may be a disk storage device, a flash memory device, or other suitable memory or data storage device. Each module of the system (100) is described in details below. In one or more embodiments, In addition, In one or more embodiments, the mobile device (121) includes the camera (122) that is configured to capture a live facial image of the payee (101). The live facial image is a facial image captured when the payee (101) is in the presence of the user (132) holding the mobile device (121) to direct the camera (122) at the payee (101). In one or more embodiments, the camera (122) and the display (131) are installed on the opposite sides of the mobile device (121) such that the user (132) may view the augmented reality displayed on the display (131) while directing the camera (122) at the payee (101) to capture the live facial image at the same time. In one or more embodiments, the facial image is a static image of a face of the payee (101). In one or more embodiments, the facial image is a video snap shot (e.g., a video frame in a video stream) of a face of the payee (101). In one or more embodiments, the facial image is real-time playback of captured video stream of a face of the payee (101).

In one or more embodiments, the mobile device (121) includes the payee analyzer (123) executing on the processor (130) and configured to analyze the captured facial image to identify the payee (101). Specifically, identifying the payee (101) includes retrieving an identifier of the payee (101) from a set of identifiers of various people recognizable by the payee analyzer (123) based on facial image characteristics. Specifically, the payee analyzer (123) is configured to analyze the facial image of the payee (101) based on a pre-determined criterion to generate a facial feature signature (not shown) representing facial features of the payee (101). The pre-determined criterion may be based on facial feature extraction or other suitable techniques known to those skilled in the art. The facial feature signature of the payee (101) is then compared to a number of facial feature signatures indexing the set of identifiers (of the aforementioned people recognizable by the payee analyzer (123) based on facial image characteristics) in a facial feature signature library (127) to generate a match. In one or more embodiments, the facial image characteristics may be unspecific to any human recognizable facial feature and is stored in a facial image library. Throughout this disclosure, the term "facial feature signature library" and "facial image library" may be used interchangeably depending on the context.

In one or more embodiments, the facial feature signature library (127) stores entries of (identifier, facial feature signature) pairs where the identifier of each entry can be searched based on the corresponding facial feature signature, and vice versa. Said in other words, the payee analyzer (123) compares the facial feature signature generated from the captured live facial image of the payee (101) with the facial feature signature contained in each entry of the facial feature signature library (127) to find a match. Once the match is found, the corresponding identifier in the (identifier, facial feature signature) pair is retrieved to identify the payee (101). In one or more embodiments, the identifier of the payee (101) may be a name or an email address of the payee (101), or other human recognizable identifier identifying the payee (101). In one or more embodiments, the identifier of the payee (101) may be a computerized code and is not human recognizable.

If the payee (101) is not recognized by the payee analyzer (123) based on the captured facial image, the payee (101) will be invited to be included in the facial feature signature library (127). In one or more embodiments, in response to determining that the facial feature signature of the payee (101) does not match any entry in the facial feature signature library (127), the payee analyzer (123) sends an invitation to the payee (101) to invite the payee (101) to be included in the facial feature signature library (127). If the payee (101) accepts the invitation, the captured facial image and an identifier of the payee (101) will be stored in a new entry of the facial feature signature library (127). For example, the identifier may be provided by the payee (101) or automatically generated by the payee analyzer (123).

In one or more embodiments, the mobile device (121) includes the user interface module (124) executing on the processor (130) and configured to display a composite image of the live facial image of the payee (101) overlaid with payment recipient identification information of the payee (101). In one or more embodiments, additional images based on the live facial image of the payee (101) are also displayed in a sequence of augmented reality images viewable by the user (132) during the process of the aforementioned face-to-face payment. In one or more embodiments, the displayed composite images in the augmented reality may include one or more of account information (129) of the user (132), a selection menu for the user (132) to choose a particular account for making the payment, transaction history of payments previously made to the payee (101) by the user (132), action button(s) for authorizing and/or initiating the payment, etc. In general, the augmented reality provides an overview of the payee (101) for the user (132) to assist the face-to-face payment. In one or more embodiments, the account information (129) is stored locally in the repository (126) of the mobile device (121) and relates to the user payment account (111) of the user (132) held at the payment service (110) and/or the user financial account (114) of the user (132) held at the financial institution (113). In one or more embodiments, the transaction history of payments made to the payee (101) by the user (132) may be stored in the repository (126) or retrieved from a payment service (110).

In one or more embodiments, the user interface module (124) is configured to retrieve, from a registered payee list (128), payment recipient identification information of the payee (101) based on the identifier of the payee (101), as retrieved from the facial feature signature library (127). In one or more embodiments, the registered payee list (128) stores information regarding payees whom are paid by the user (132) from time to time. Such information is stored in entries that are indexed by the identifier of these payees. In one or more embodiments, such payees are a portion of the aforementioned group of people recognizable by the payee analyzer (123) based on the facial image characteristics. Each entry of the registered payee list (128) may include payment recipient identification information such as one or more of a recipient name, an email address, a residence address, a business address, a telephone number, a profession, a payment recipient account number, and/or other pertinent information regarding the payees that are relevant for the user (132) to identify the payees, as well as required for the payees to be specified as payment recipients to a financial institution or payment service. In one or more embodiments, the registered payee list (128) is compiled based on information provided by various registered payees according to a pre-determined registration agreement setting forth terms and conditions for the face-to-face payment using the mobile device (121). In the scenario when the payee (101) is not initially recognized by the payee analyzer (123) and accepts the invitation to be included in the facial feature signature library (127), the newly assigned identifier of the payee (101) is used to generate a new entry in the registered payee list (128). To complete this new entry, the payee (101) is asked to provide payment recipient identification information to be included in the registered payee list (128).

In one or more embodiments, the registered payee list (128) and the facial feature signature library (127) are separate from each other. In one or more embodiments, the registered payee list (128) and the facial feature signature library (127) are combined where payment recipient identification information and facial image signature of the same payee are stored in a single entry.

In one or more embodiments, the user interface module (124) receives, in response to displaying one or more of the composite images of the augmented realty, an input from the user (132) authorizing the payment to the payee (101) using the user payment account (111) and/or the financial account (114) of the user (132). In one or more embodiments, the input from the user (132) may include a user touch to a payment authorization touch field (e.g., labeled as "PAY," "GO," or other description indicating initiation of the payment) and a payment amount entered into a payment amount text field in the composite image.

In one or more embodiments, the mobile device (121) includes a payment module (125) executing on the processor (130) and configured to initiate, in response to receiving the input from the user (132) and based on the input from the user (132), the payment to the payee (101) who is identified as the payment recipient based on the payment recipient identification information of the payee (101). For example, the payment to the payee (101) may be initiated by sending, to the financial institution (113), a payment request based on the payment recipient identification information of the payee (101) retrieved by the payee analyzer (123), and the payment amount received from the user interface module (124). For example, the financial institution (113) may be a bank, a credit card processor, or other suitable financial institution. In one or more embodiments, the financial institution (113) maintains the user financial account (114) of the user (132). In one or more embodiments, the payment module (125) is configured to send all payment requests exclusively to the financial institution (113) and to specify the user financial account (114) as a default account for making the payment. In one or more embodiments, the user (132) may have selected, using the user interface module (124), the user financial account (114) to make the payment to the payee (101) by selectively authorizing the financial institution (113) to deduct the payment amount from an account balance of the user financial account (114). In one or more embodiments, the payment recipient information may include a current mailing address of the payee (101) that is included in the payment request for receiving a payment check from the financial institution (113).

In another example, the payment to the payee (101) may be initiated by sending, to the payment service (110), a payment request based on the payment recipient identification information of the payee (101) retrieved by the payee analyzer (123), and the payment amount received from the user interface module (124). In one or more embodiments, the payment service (110) includes a computer server operated by a third party payment service provider to host payment accounts of users (e.g., user payment account (111) for the user (132)) for providing payment services. In one or more embodiments, the payment service (110) maintains the user payment account (111) for the user (132) that includes functionalities for managing payment initiation and record keeping using multiple financial institutions (e.g., financial institution (113)) of the user (132). The user payment account (111) includes account information, access credential, transaction history, etc. of each of the financial institutions where the user (132) holds a financial account.

For example, the user (132) may have selected the user financial account (114) maintained for the user (132) in the financial institution (113) to make the payment to the payee (101). Accordingly, the financial institution (113) is selected from the multiple financial institutions managed under the user payment account (111) based on the account selection (112) contained in the payment request received from the mobile device (121). Once the payment request received from the mobile device (121) is authenticated and processed, a payment instruction is in turn sent from the payment service (110) to the financial institution (113) to pay the payee (101) from the user financial account (114). The transaction details of such payment is provided by the financial institution (113) to the payment service (110) which then logs it in the transaction history of the user payment account (111).

In yet another example, both the user (132) and the payee (101) are registered users of the payment service (110). In this example, the user (132) may have selected to make the payment to the payee (101) using direct account transfer from the user payment account (111) into another account of the payee (101) held at the payment service. Once the payment request received from the mobile device (121) is authenticated and processed, the payment is completed by debiting the user payment account (111) and crediting the account of the payee (101) held at the payment service (110). The transaction details of such payment are logged by the payment service (110) in the transaction history of the user payment account (111). In this example scenario, the financial institution (113) is not involved in completing the payment.

Figure 2:
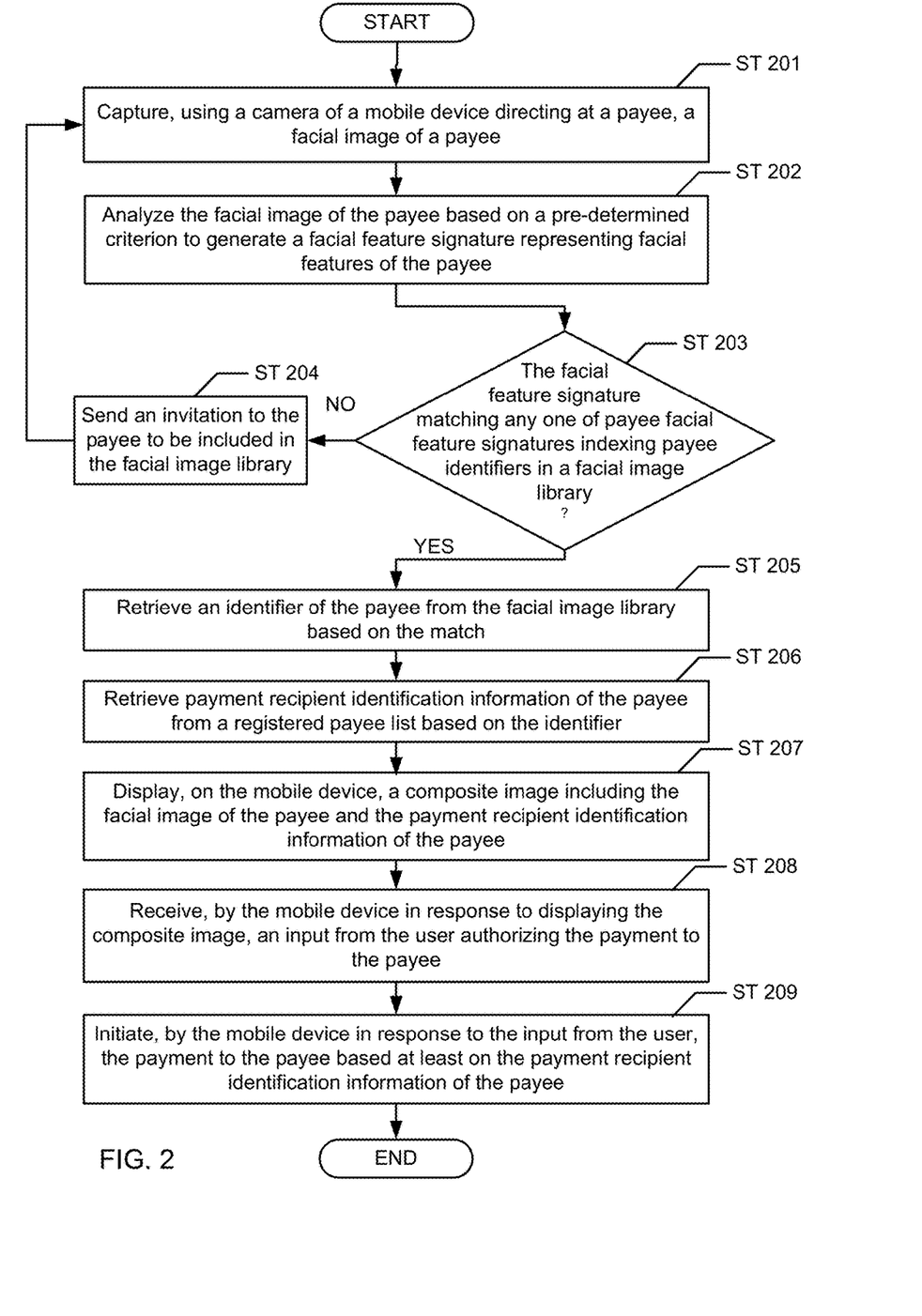
FIG. 2 shows a flowchart of a method for face-to-face payment with augmented reality in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

As noted above, the method shown in FIG. 2 may be used to assist face-to-face payment using a mobile device based on augmented reality. Specifically, the payment is due to a payee from a user of the mobile device and is made when both the payee and the user are present together in accordance with one or more embodiments of the invention. This payee is also referred to as the present payee depending on the context.

Initially in Step 201, a facial image of the payee is captured using a camera of the mobile device directing at the payee in accordance with one or more embodiments of the invention. This facial image captured in the presence of both the user and the payee is referred to as a live facial image, which is used to retrieve an identifier of the payee from a facial image library to identify the payee. In one or more embodiments, each entry of the facial image library includes a pair of (identifier, facial image attribute(s)) where the live facial image is compared to facial image attribute(s) in each entry to identify a match. For example, the identifier may include one or more of a name, an email address, a computerized code, or other suitable label or tag unique (within the mobile device) to the payee. If a match is found, the corresponding identifier is retrieved to identify the payee. If no match can be found throughout the entire facial image library, then the payee is invited to register to be included in the facial image library. In one or more embodiments, the facial image attribute(s) in each facial image library entry is based on specific features (e.g., the relative position, size, and/or shape of the eyes, nose, cheekbones, jaw, etc.) of a human face and is also referred to as a facial feature signature. In one or more embodiments, the facial image attribute(s) in each facial image library entry represents a mathematical model of the facial image and is unspecific to any human recognizable feature (e.g., the relative position, size, and/or shape of the eyes, nose, cheekbones, jaw, etc.) of a human face. Throughout this disclosure, the terms "facial image attribute(s)" and "facial feature signature" may be used interchangeably depending on the context. Additional details are described below.

In Step 202, in accordance with one or more embodiments of the invention, the live facial image is analyzed based on a pre-determined criterion to generate a facial feature signature that represents facial features (e.g., the relative position, size, and/or shape of the eyes, nose, cheekbones, jaw, etc.) of the present payee. In one or more embodiments, the pre-determined criterion is based on facial recognition techniques known to those skilled in the art.

In Step 203, the facial feature signature of the present payee is compared to entries of the facial feature signature library to determine if any match can be found. In one or more embodiments, identifiers of previously registered payees are indexed by facial feature signatures in the facial feature signature library in accordance with one or more embodiments of the invention. If the facial feature signature of the present payee does not match any one of the facial feature signatures in library, the method proceeds to Step 204 where an invitation is sent to the payee to be included in the facial feature signature library. For example, the invitation may be sent using a text message or an email based on a phone number or email address provided by the present payee. Upon the present payee accepting the invitation, a new entry is created in the facial feature signature library to include a new facial feature signature (based on the live facial image of the present payee) and a newly assigned identifier. This newly assigned identifier may be provided by the present payee or automatically generated as a computerized code.

If the facial feature signature of the present payee matches a facial feature signature in the library, the method proceeds to Step 205 where the identifier of the present payee is retrieved from the facial feature signature library based on the match. In Step 206, payment recipient identification information of the present payee is retrieved from a registered payee list based on the identifier in accordance with one or more embodiments of the invention. Specifically, the payment recipient identification information may include one or more of a recipient name, an email address, a residence address, a business address, a telephone number, a profession, a payment recipient account number, and/or other information typically required to identify the present payee as a payment recipient to a financial institution or a payment service. For example, one or more of the recipient name, email address, residence address, business address, telephone number, profession, and payment recipient account number may be used to set up a check mailing or direct account transfer by the financial institution or a payment service. In one or more embodiments, the registered payee list is compiled based on information provided by various registered payees according to a pre-determined registration agreement setting forth terms and conditions for the face-to-face payment using the mobile device.

In Step 207, a composite image is displayed on the mobile device as an augmented reality to assist the face-to-face payment by the user in accordance with one or more embodiments of the invention. In particular, the composite image includes the live facial image of the present payee and the payment recipient identification information. In one or more embodiments, transaction history between the payee and the user is retrieved from a payment service provider based on the payment recipient identification information. Accordingly, the transaction history may also be selectively displayed in the composite image. In one or more embodiments, the composite image may also include one or more of a payment amount text field, a payment account selection menu, and a payment authorization touch field to receive user input specifying the payment amount, payment account, and activating the payment. In one or more embodiments, the augmented reality may include multiple composite images displayed in a sequence with each composite image showing the live facial image overlaid with various different information relevant to the face-to-face payment process.

In Step 208, in response to displaying the composite image, an input is received from the user authorizing the face-to-face payment in accordance with one or more embodiments of the invention. For example, the input may include a payment amount, a payment account selection, and a payment activation command. In Step 209, in response to receiving the user input, the face-to-face payment to the present payee is initiated by the mobile device. In one or more embodiments, the payment is initiated by sending a payment request to the user selected financial institution directly. In one or more embodiments, the payment is initiated by sending a payment request to a third party payment service which in turn sends a payment instruction to the user selected financial institution based on certain business agreements.

Figure 3A:
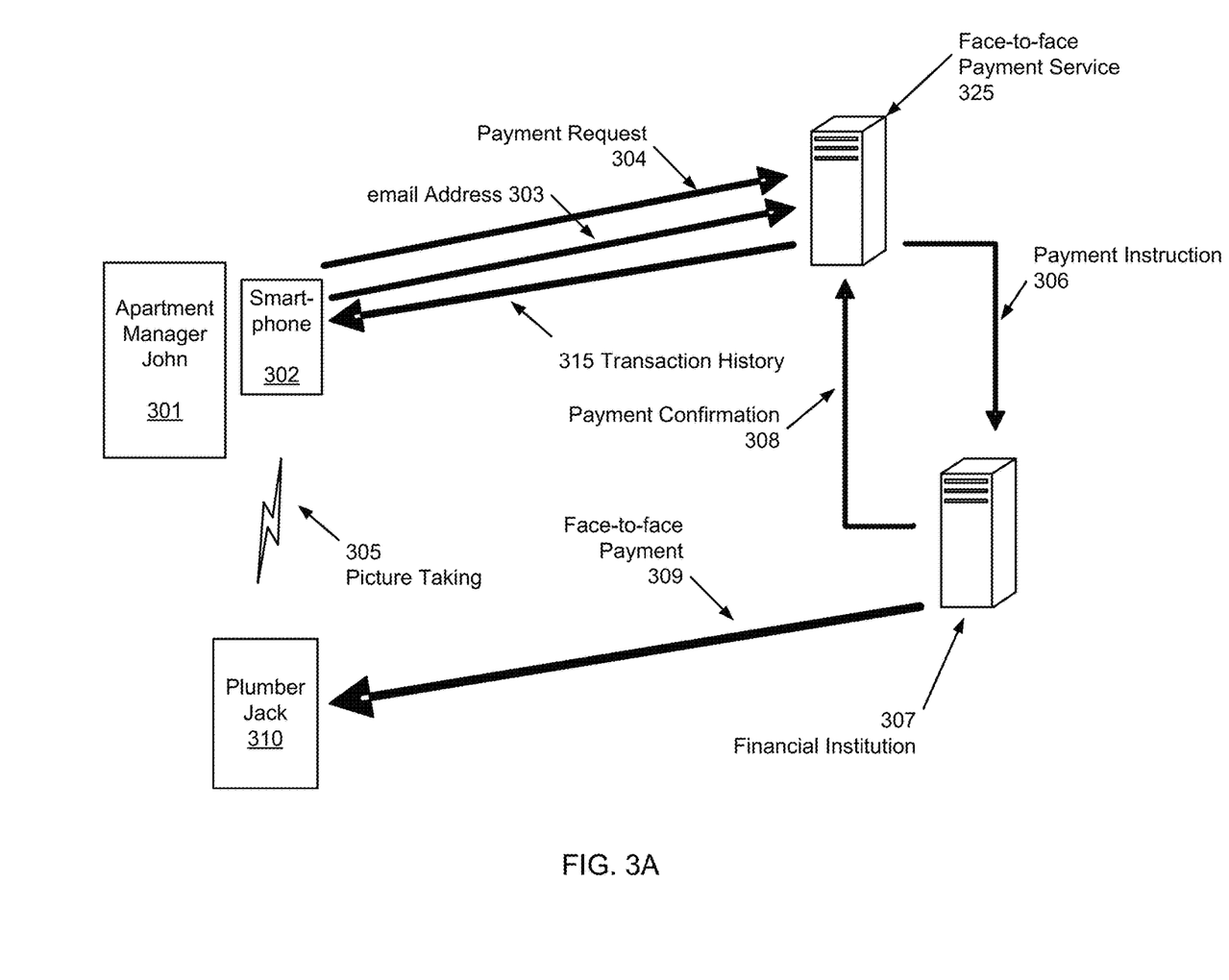
FIGS. 3A and 3B show an example of face-to-face payment with augmented reality in accordance with one or more embodiments of the invention.
Figure 3B:
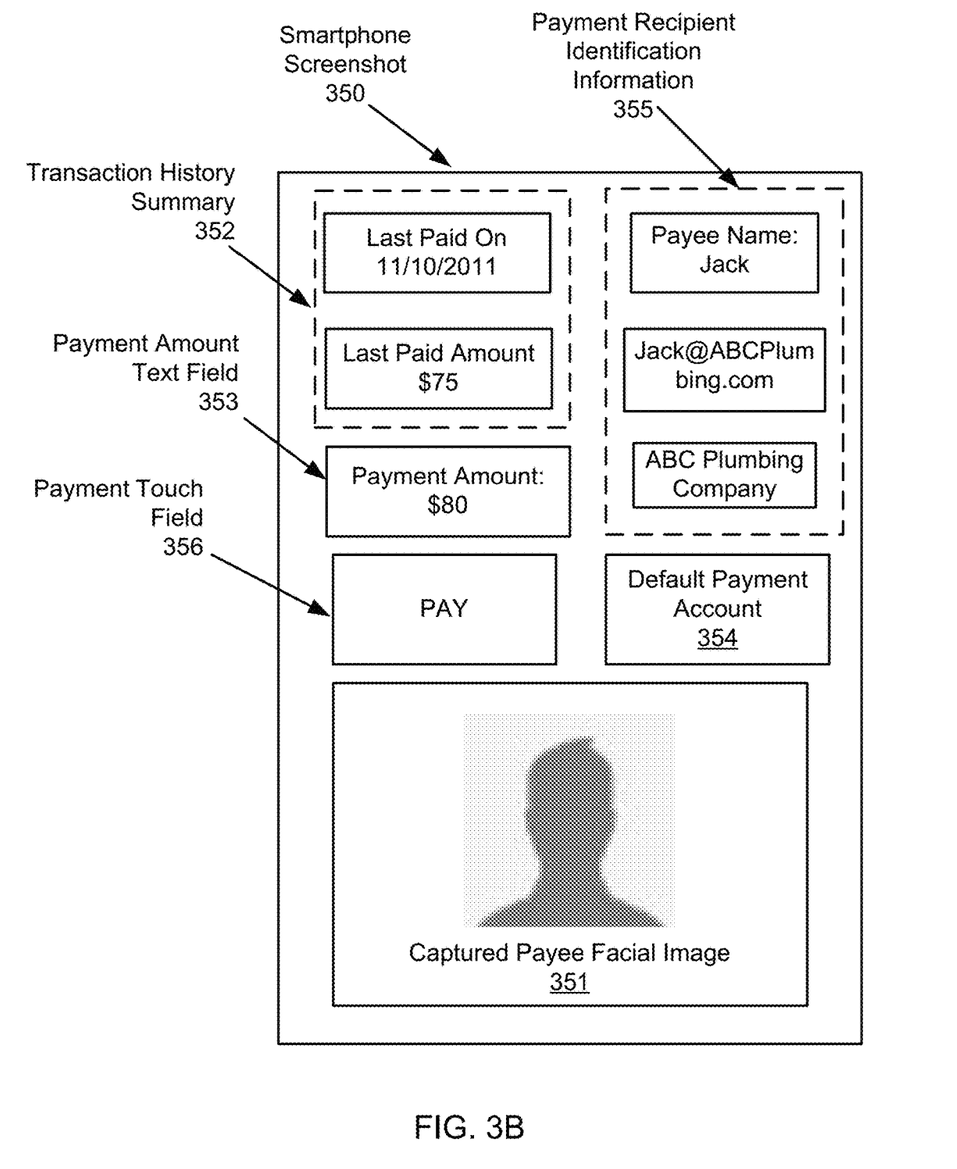

FIGS. 3A and 3B show an application example in accordance with one or more embodiments of the invention. This example application may be practiced using the system (100) of FIG. 1 and based on the method described with respect to FIG. 2 above.

In the example scenario shown in FIG. 3A, an apartment manager John (301) uses his smartphone (302) to complete a face-to-face payment (309) for paying a plumber Jack (310) who just completed a repair for John (301) at an apartment complex. Both John (301) and Jack (310) are registered users of the face-to-face payment service (325). John (301) stores information about each of his contractors/handymen along with a picture in his contact list application installed on his smartphone (302). In particular, the contact list application has a contact entry of Jack (310) that stores Jack's email address (303), Jack's picture, and other pertinent information. In addition, the contact list application is configured with facial recognition capability. John's smartphone (302) is also installed with the face-to-face application downloaded from the face-to-face payment service (325), as described in reference to FIGS. 1 and 2 above.

To make a payment for the repair job completed by Jack (310), John (301) pulls out his smartphone (302), opens the face-to-face application and points the camera of the smartphone (302) at Jack (310) (right in front of him at the job site) to take a live facial shot of Jack, depicted in FIG. 3A as picture taking (305). Instantly, Jack (310) is identified as the payee with email address (303) by the face-to-face payment application in conjunction with the contact list application. Once Jack (310) is identified as the payee, the face-to-face application sends Jack's email address (303) from the contact list application to the payment service (325), which identifies Jack (310) as a registered user of the face-to-face payment service (325) and retrieves transaction history (315) for sending back to John's smartphone (302). In particular, the transaction history (315) includes prior payments between John's account and Jack's account held at the face-to-face payment service (325). Accordingly, John's smartphone (302) presents an augmented reality showing Jack's email address (303) and the transaction history (315) overlaying the live facial image of Jack (310) on the display screen of the smartphone (302).

FIG. 3B shows a smartphone screenshot (350) of the augmented reality. As shown, the smartphone screenshot (350) includes the captured payee facial image (351) of Jack (310), transaction history summary (352) extracted from the transaction history (315), payment recipient identification information (355) including Jack's nickname, trade name, and email address (i.e., email address (303) shown in FIG. 3A). As noted above, the captured payee facial image (351) may be a static image of Jack's face, a video snap shot of Jack's face, or real-time playback of captured video stream of Jack's face. In addition, a payment amount text field (353) is provided to which John has entered an amount of $80. Further, the screenshot (350) also includes two additional fields: the default payment account (354) and the payment touch field (356). The default payment account (354) is pre-defined as John's checking account held at the financial institution (307) shown in FIG. 3A while the payment touch field (356) is a command button labeled as "PAY." While viewing the screenshot (350), John (301) confirms that the payment recipient identification information (355) appears to be in order and that the payment amount $80 appears to be in line with the transaction history summary (352). Said in other words, John (301) is now comfortable he is not overpaying Jack (310) for the repair and that the money will be sent to the appropriate destination. At this point, John (301) can change the payment account by clicking the default payment account (354) to activate a pull-down menu that allows him to select other payment methods such as a credit card account previously registered with the face-to-face payment service (325) or a direct account transfer at the face-to-face payment service (325). Information regarding John's checking account, credit card account, and direct transfer configuration are stored in John's payment account held at the face-to-face payment service (325). Upon finalizing which account to use for making the payment, John clicks the payment touch field (356) (i.e., the "PAY" button) to initiate the payment to Jack (310).

Returning to the discussion of FIG. 3A, in response to John clicking the "PAY" button on his smartphone (302), the face-to-face application sends the payment request (304) to the face-to-face payment service (325). The payment request (304) contains John's selection to use the default payment account (i.e., John's checking account held at the financial institution (307)) for payment, the payment amount of $80, and Jack's email address (303) as the payment recipient identification information to identify Jack's account at the face-to-face payment service (325).

Upon receiving the payment request (304), the face-to-face payment service (325) looks up Jack's account profile based on Jack's email address (303) to find Jack's current mailing address. In turn, the face-to-face payment service (325) sends the payment instruction (306) to the financial institution (307) to mail a check of $80 to Jack's current mailing address and deduct $80 from John's checking account. The payment instruction (306) is acknowledged and carried out by the financial institution (307) based on a three-party face-to-face payment agreement previously entered into among John (301), the face-to-face payment service (325), and the financial institution (307). Once the check is mailed to Jack (310) as the face-to-face payment (309), the financial institution (307) sends the payment confirmation (308) to the face-to-face payment service for record keeping.

In another example scenario, John (301) clicks the touch field of default payment account (354), activates the account selection pull-down menu, and changes the payment method to use a direct transfer from his account held at the face-toface payment service (325) into Jack's account held at the face-to-face payment service (325). In this example scenario, the $80 payment is completed entirely within the face-to-face payment service (325) by debiting $80 from John's account held at the face-to-face payment service (325) and in turn crediting $80 to Jack's account held at the face-to-face payment service (325). Accordingly, the payment instruction (306), payment confirmation (308), and check mailing are all eliminated. Although in the example shown in FIG. 3B, the transaction history summary (352), payment recipient identification information (355), and other text fields/command buttons are displayed next to the captured payee facial image (351), other layout arrangements are also possible. For example, one or more of the transaction history summary (352), payment recipient identification information (355), and other text fields/command buttons may be displayed as overlay to the captured payee facial image (351).

Figure 4:
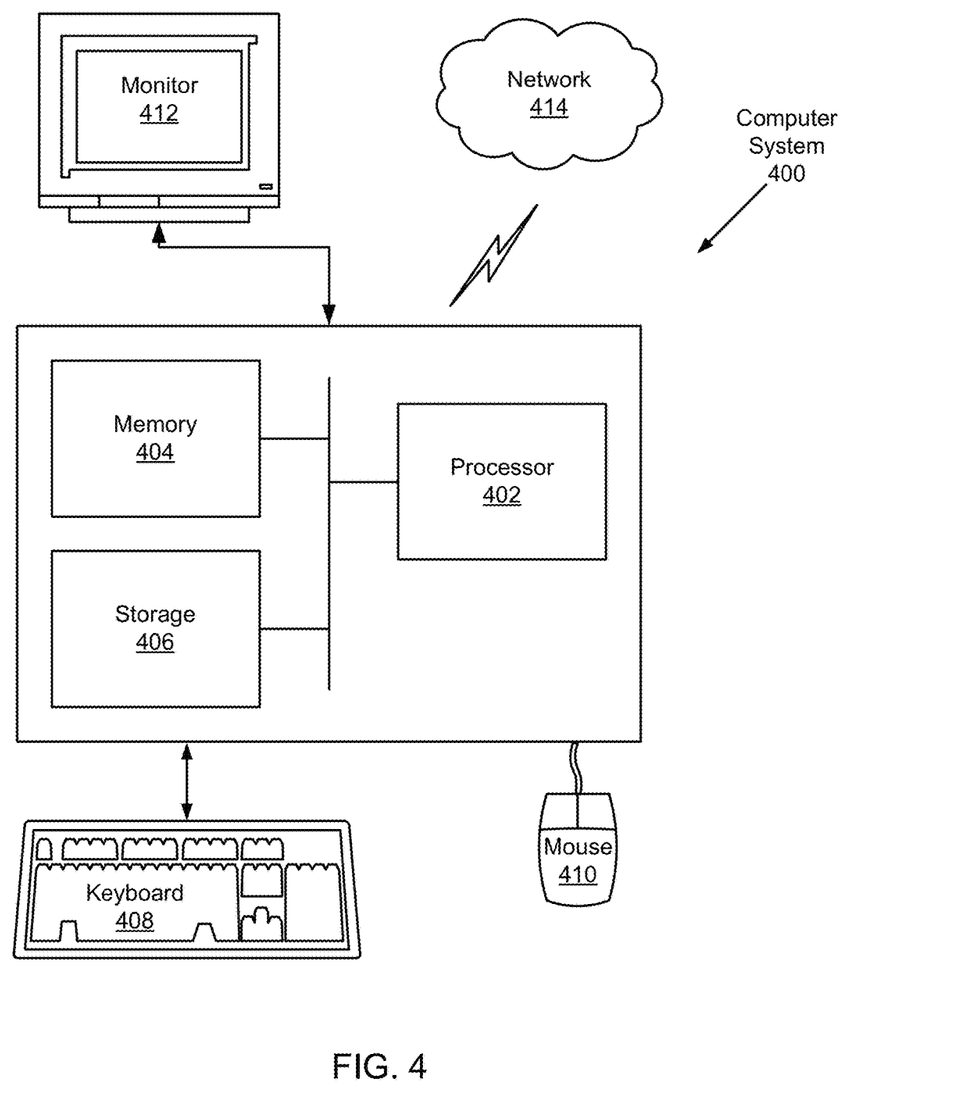
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making a payment using a mobile device, comprising:
    capturing a facial image of a payee using a camera of the mobile device directed at the payee who is in the presence of a user of the mobile device, wherein the payment is due from the user of the mobile device to the payee;
    analyzing the facial image of the payee based on a pre-determined criterion to generate a facial feature signature representing facial features of the payee;
    comparing the facial feature signature to a plurality of facial feature signatures indexing a plurality of identifiers in a facial feature signature library;
    sending, in response to determining that the facial feature signature does not match any of the plurality of facial feature signatures indexing the plurality of identifiers in the facial feature signature library, an invitation to the payee to be included in the facial feature signature library, wherein, in response to the payee accepting the invitation, a new entry is created of the payee in the facial feature signature library that includes:
        the facial feature signature generated based on analyzing the facial image of the payee captured by the mobile device of the user, and
        an identifier of the payee;
    retrieving, by a processor of the mobile device, the identifier of the payee based on the facial image;
    retrieving payment recipient identification information of the payee from a registered payee list based on the identifier, wherein the registered payee list stores information regarding a plurality of payees and indexed by the plurality of identifiers;
    displaying, on the mobile device, a composite image comprising the facial image of the payee, the payment recipient identification information of the payee, and a default account touch field that allows selection of a default payment account from a pull-down menu;
    receiving, by the mobile device in response to displaying the composite image, an input from the user authorizing the payment from the default payment account to the payee; and
    initiating, by the processor on the mobile device in response to receiving the input from the user, the payment from the default payment account to the payee based on the payment recipient identification information.

2. The method of claim 1,
    wherein the processor of the mobile device is configured to analyze the facial image, and
    wherein the registered payee list is stored on the mobile device.

3. The method of claim 1, wherein the identifier of the payee is provided by the payee in response to the invitation.

4. The method of claim 1,
    wherein the payment recipient identification information of the payee comprises at least one selected from a group consisting of a recipient name, an email address, a residence address, a business address, a telephone number, a profession, and a payment recipient account number, and wherein initiating the payment to the payee comprises sending a payment request based on a portion of the payment recipient identification information to a payment service provider.

5. The method of claim 1, further comprising:
retrieving, from a payment service provider, transaction history between the payee and the user based on the payment recipient identification information,
wherein the composite image further comprises the transaction history, and
wherein initiating the payment to the payee comprises sending a payment request to the payment service provider.

6. The method of claim 1, wherein the identifier of the payee comprises an email address.

7. The method of claim 1, further comprising:
displaying a payment authorization touch field and a payment amount text field in the composite image,
wherein the input from the user comprises a touch action to the payment authorization touch field and a payment amount entered into the payment amount text field.

8. The method of claim 1,
wherein the pull-down menu includes one or more of a previously registered credit card account and a direct transfer account.

9. A mobile device for making a payment, comprising:
a camera configured to capture a facial image of a payee while directed at the payee who is in the presence of a user of the camera, wherein the payment is due from the user of the mobile device to the payee;
a payee analyzer executing on a processor of the mobile device and configured to:
analyze the facial image of the payee based on a pre-determined criterion to generate a facial feature signature representing facial features of the payee,
compare the facial feature signature to a plurality of facial feature signatures indexing a plurality of identifiers in a facial feature signature library,
send, in response to determining that the facial feature signature does not match any of the plurality of facial feature signatures indexing the plurality of identifiers in the facial feature signature library, an invitation to the payee to be included in the facial feature signature library, wherein, in response to the payee accepting the invitation, a new entry is created of the payee in the facial feature signature library that includes:
the facial feature signature generated based on analyzing the facial image of the payee captured by the mobile device of the user, and
an identifier of the payee, and
retrieve the identifier of the payee based on the facial image;
a user interface module executing on the processor and configured to:
retrieve payment recipient identification information of the payee from a registered payee list based on the identifier, wherein the registered payee list stores information regarding a plurality of payees and indexed by the plurality of identifiers;
display a composite image comprising the facial image of the payee, the payment recipient identification information of the payee, and a default account touch field that allows selection of a default payment account from a pull-down menu; and
receive, in response to displaying the composite image, an input from the user authorizing the payment from the default payment account to the payee; and a payment module executing on the processor and configured to initiate, in response to receiving the input from the user, the payment from the default payment account to the payee based on the payment recipient identification information.

10. The mobile device of claim 9, further comprising:
a repository configured to store the registered payee list and the facial feature signature library.

11. The mobile device of claim 10,
wherein the repository is further configured to store account information of the user and wherein the pull-down menu includes one or more of a previously registered credit card account and a direct transfer account.

12. The mobile device of claim 9, wherein the identifier of the payee is provided by the payee in response to the invitation.

13. The mobile device of claim 9,
wherein the payment recipient identification information of the payee comprises at least one selected from a group consisting of a recipient name, an email address, a residence address, a business address, a telephone number, a profession, and a payment recipient account number, and
wherein initiating the payment to the payee comprises sending a payment request based on a portion of the payment recipient identification information to a payment service provider.

14. The mobile device of claim 9, the user interface module further configured to:
retrieve, from a payment service provider, transaction history between the payee and the user based on the payment recipient identification information,
wherein the composite image further comprises the transaction history, and
wherein initiating the payment to the payee comprises sending a payment request to the payment service provider.

15. The mobile device of claim 9, wherein the identifier of the payee comprises an email address.

16. The mobile device of claim 9, the user interface module further configured to:
display a payment authorization touch field and a payment amount text field in the composite image,
wherein the input from the user comprises a touch action to the payment authorization touch field and a payment amount entered into the payment amount text field.

17. A non-transitory computer readable storage medium comprising instructions for making a payment using a mobile device, that when executed, comprise functionality to:
capture a facial image of a payee using a camera of the mobile device directed at the payee who is in the presence of a user of the mobile device, wherein the payment is due from the user of the mobile device to the payee;
analyze the facial image of the payee based on a pre-determined criterion to generate a facial feature signature representing facial features of the payee;
compare the facial feature signature to a plurality of facial feature signatures indexing a plurality of identifiers in a facial feature signature library;
send, in response to determining that the facial feature signature does not match any of the plurality of facial feature signatures indexing the plurality of identifiers in the facial feature signature library, an invitation to the payee to be included in the facial feature signature library, wherein, in response to the payee accepting the invitation, a new entry is created of the payee in the facial feature signature library that includes:
  the facial feature signature generated based on analyzing the facial image of the payee captured by the mobile device of the user, and
  an identifier of the payee;
retrieve the identifier of the payee based on the facial image;
retrieve payment recipient identification information of the payee from a registered payee list based on the identifier, wherein the registered payee list stores information regarding a plurality of payees and indexed by the plurality of identifiers;
display, on the mobile device, a composite image comprising the facial image of the payee, the payment recipient identification information of the payee, and a default account touch field that allows selection of a default payment account from a pull-down menu;
receive, in response to displaying the composite image, an input from the user authorizing the payment from the default payment account to the payee; and
initiate, in response to receiving the input from the user, the payment from default payment account to the payee based on the payment recipient identification information.

18. The non-transitory computer readable storage medium of claim 17, wherein the registered payee list and the facial feature signature library are stored on the mobile device.

19. The non-transitory computer readable storage medium of claim 17, wherein the identifier of the payee is provided by the payee in response to the invitation.

20. The non-transitory computer readable storage medium of claim 17,
  wherein the payment recipient identification information of the payee comprises at least one selected from a group consisting of a recipient name, an email address, a residence address, a business address, a telephone number, a profession, and a payment recipient account number, and
  wherein initiating the payment to the payee comprises sending a payment request based on a portion of the payment recipient identification information to a payment service provider.

21. The non-transitory computer readable storage medium of claim 17, the instructions when executed further comprising functionality to:
  retrieve, from a payment service provider, transaction history between the payee and the user based on the payment recipient identification information,
  wherein the composite image further comprises the transaction history, and
  wherein initiating the payment to the payee comprises sending a payment request to the payment service provider.

22. The non-transitory computer readable storage medium of claim 17, wherein the identifier of the payee comprises an email address.

23. The non-transitory computer readable storage medium of claim 17, the instructions when executed further comprising functionality to:
  display a payment authorization touch field and a payment amount text field in the composite image,
  wherein the input from the user comprises a touch action to the payment authorization touch field and a payment amount entered into the payment amount text field.

24. The non-transitory computer readable storage medium of claim 17,
  wherein pull-down menu includes one or more of a previously registered credit card account and a direct transfer account.

* * * * *